(12) United States Patent
Takashima et al.

(10) Patent No.: US 6,656,987 B2
(45) Date of Patent: Dec. 2, 2003

(54) POLYPROPYLENE RESIN COMPOSITION AND INJECTION MOLDED ARTICLE

(75) Inventors: Isao Takashima, Ibaraki (JP); Kenichi Ohkawa, Ichihara (JP); Tomohisa Fukao, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 55 days.

(21) Appl. No.: 09/989,488

(22) Filed: Nov. 21, 2001

(65) Prior Publication Data

US 2002/0095004 A1 Jul. 18, 2002

(30) Foreign Application Priority Data

Nov. 24, 2000 (JP) ........................................ 2000-357362

(51) Int. Cl.⁷ .................................................. C08K 5/52
(52) U.S. Cl. ........................ 524/127; 524/451; 428/516
(58) Field of Search ................................ 524/451, 127; 428/516

(56) References Cited

U.S. PATENT DOCUMENTS 4,551,501 A * 11/1985 Shiga et al. .................. 525/88
5,891,946 A * 4/1999 Nohara et al. ............... 524/427
6,156,836 A * 12/2000 Iwanami et al. ............. 524/451
6,238,615 B1 * 5/2001 Kobayashi et al. ......... 264/537

FOREIGN PATENT DOCUMENTS

| JP | 9-176328 | 7/1997 |
| JP | 9-194652 | 7/1997 |
| JP | 10-306181 | 11/1998 |

* cited by examiner

*Primary Examiner*—Peter D. Mulcahy
*Assistant Examiner*—Henry Hu
(74) *Attorney, Agent, or Firm*—Birch, Stewart, Kolasch & Birch, LLP

(57) ABSTRACT

A polypropylene resin composition which comprises 100 parts by weight of a propylene homopolymer, 0.01 to 1.0 part by weight of phosphoric acid ester type nucleating agent (a) and 1.5 to 5 parts by weight of talc (b), wherein the composition satisfies the following condition (1):

(1) the injection molded article of the polypropylene resin composition has degrees of orientation A and orientation B measured by wide angle X-ray diffraction of not less than 35 and not less than 300, respectively.

9 Claims, No Drawings

POLYPROPYLENE RESIN COMPOSITION AND INJECTION MOLDED ARTICLE

BACKGROUND OF THE INVENTION

1. Field of the Invention

The present invention relates to a polypropylene resin composition and an injection molded article thereof. More particularly, the present invention relates to a polypropylene resin composition which provides a injection-molded article with excellent rigidity and thermal resistance, and small anisotropy of mold shrinkage coefficient of the mold article, and to an injection molded article comprising the polypropylene resin composition.

2. Description of Related Art

A polypropylene resin is light in weight, and excellent in mechanical properties and moldability. The resin is, therefore, has been used widely in various application fields. As a method for improving the mechanical properties, use of a nucleating agent is known.

For example, JP10-306181A discloses that a polypropylene resin composition mainly containing crystalline polypropylene with degrees of b-axis orientation of more than 720 as determined by the ratio of intensities of specified diffraction peaks measured by wide angle X-ray diffraction taken in the vicinity of the central portion of an ASTM No. 1 dumbbell specimen prepared by injection molding, an excellent moldability and good mechanical properties.

In recent years, however, applications of polypropylene resin composition has been enlarged, conventional polypropylene resin compositions are insufficient in rigidity and thermal resistance for an application, and particularly, in large molded articles, deformation or warp sometimes generates. It is considered that one of the reason for these phenomena is ascribed to anisotropy of mold shrinkage coefficient of the mold article, and hence an improvement of these characteristics have been desired.

SUMMARY OF THE INVENTION

An object of the present invention is to provide a polypropylene resin composition which can provide an injection molded article having excellent rigidity and thermal resistance, and a small anisotropy of mold shrinkage coefficient, and an injection molded article comprising said polypropylene resin composition.

As a result of extensive studies, the inventors have found that a polypropylene resin composition containing both of a specified nucleating agent (a) in a specific amount range and another specified nucleating agent (b) in a specific amount range and having orientation degrees (A) and (B) determined by wide angle X-ray diffraction of the injection molded article of the composition in specified ranges, respectively, could solve the above problems, and have completed the present invention.

Namely, the present invention relates to a polypropylene resin composition which comprises 100 parts by weight of a propylene homopolymer, 0.01 to 1.0 part by weight of phosphoric acid ester type nucleating agent (a) (hereinafter, sometimes referred to as "nucleating agent (a)") and 1.5 to 5 parts by weight of talc (b) (hereinafter, sometimes referred to as "nucleating agent (b)"), wherein the composition satisfies the following condition(1):

(1) the injection molded article of the polypropylene resin composition has degrees of orientation A and orientation B measured by wide angle X-ray diffraction of not less than 35 and not less than 300, respectively.

Further the present invention is related to an injection molded article comprising the polypropylene resin composition.

The present invention will be described in detail below.

DETAILED DESCRIPTION OF THE INVENTION

The melt index of the propylene homopolymer used in the invention is not specifically limited. However, the melt index is usually 0.01 to 200 g/10 min., preferably 1 to 100 g/10 min. and more preferably 10 to 50 g/10 min. from viewpoint of moldability.

The crystallinity of the propylene homopolymer used in the present invention is not specifically limited, but a propylene homopolymer with higher crystallinity is preferred from the viewpoint of higher performance of the injection-molded article. More specifically, it is preferable that the isotactic pentad fraction, namely, the fraction of the propylene monomer unit positioned in the center of the five successive meso-bonding chain of monomer units (expressed as [mmmm]), which is used for an index of crystallinity and is calculated based on the pentad unit in polypropylene calculated according to the method reported by A. Zambelli et al. (Macromolecules,6, 925.1973), is 0.95 or more.

The propylene homopolymer (hereinafter, sometimes referred to as "polypropylene resin") used in the present invention is not specified, is manufactured utilizing publicly known stereo specific polymerization catalyst such as a Ziegler-Natta type catalyst, metallocene type catalyst or the like, by also publicly known process.

The polypropylene resin composition of the present invention contains a phosphorus nucleating agent (a) (hereinafter, sometimes referred to as "nucleating agent (a)") and talc (b) (hereinafter, sometimes referred to as "nucleating agent (b)"). And, the polypropylene resin composition give an injection-molded article having a degree of orientation A of not less than 35, preferably not less than 40 as measured by wide angle X-ray diffraction and a degree of orientation B of not less than 300, preferably not less than 350 as measured by wide angle X-ray diffraction.

Herein, the degree of orientation A is calculated in the following manner. The polypropylene resin composition is prepared by mixing the nucleating agents (a) and (b) with the polypropylene resin, and is subjected to injection molding to provide the No. 1 dumbbell specimen according to ASTM and measurement of wide angle X-ray diffraction in the vicinity of the central portion of the dumbbell specimen with an apparatus for testing fibrous samples. The degree of orientation A is calculated according to the following equation (I) using a half value width of intensity of a peak assigned (130) face of the specimen:

$$\text{Degree of orientation } A = [(360 - \Sigma Wi)/360] \times 100 \quad (I)$$

Wherein Wi represents a half value width of intensity of each peak observed within 2θ.

Further, the degree of orientation B is determined in the following manner. The wide angle X-ray diffraction in the vicinity of the central portion of the No.1 dumbbell specimen according to ASTM is measured. The degree of orientation B is calculated according to the following equation (II) using a ratio of an intensity of peak assigned (040) face in 2θ=13.72 [I(40)] to an intensity of peak assigned (100) face in 2θ=16.45 [I(110)]:

$$\text{Degree of orientation } B = [I(040)/I(110)] \times 100 \quad (II)$$

The phosphoric acid ester type nucleating agent(a) used in the present invention includes, for example, sodium bis(4-t-butylphenyl)phosphate, sodium 2,2'-methylene bis(4,6-di-t-butylphenyl)phosphate, {[2,2'-methylene bis(4,6-di-t-butylphenyl)]phosphate}aluminum dihydroxide, bis{[2,2'-methylenebis(4,6-di-t-butylphenyl)]phosphate}aluminum hydroxide and tris{[2.2'-methylene bis(4,6-di-t-butylphenyl)phosphoric acid}aluminum. Sodium 2,2'-methylene bis(4,6-di-t-butylphenyl)phosphate is preferable.

The amount of the nucleating agent (a) used is 0.01 to 1.0 part by weight, preferably 0.05 to 0.9 part by weight, and more preferably 0.1 to 0.7 part by weight per 100 parts by weight of polypropylene resin.

When the amount is more than 1.0 part by weight, production of an injection molded article having a small anisotropy becomes difficult, and when the amount is less than 0.01 part by weight, production of an injection molded article having excellent rigidity and thermal resistance and a small anisotropy becomes difficult.

As another nucleating agent (b), talc is used. The average particle size of talc used is not particularly limited, but is preferably 1.0 to 15 µm as measured by using a particle size distribution measuring apparatus of laser diffraction scattering type.

The amount of talc used is 1.5 to 5.0 part by weight, preferably 2 to 4 part by weight, and more preferably 2.5 to 3.5 part by weight per 100 parts by weight of polypropylene resin.

When the amount is more than 5.0 parts by weight, production of an injection molded article having a small anisotropy becomes difficult, and when the amount is less than 1.5 parts by weight, production of an injection molded article having excellent rigidity and thermal resistance and a small anisotropy becomes difficult.

To the polypropylene composition of the present invention, antioxidants may be added within a range not to deteriorate the purpose and effect of the present invention. The antioxidant includes, for example, phenol type antioxidants and phosphorus type antioxidants. The phenol type antioxidant includes tetrakis-[methylene-3-(3,5-di-t-butyl-4-hydroxyphenyl)propionate]methane, 2,6-di-t-butyl-4-methyl-phenol, tris(3,5-di-t-butyl-4-hydoxyphenyl) isocyanurate and the like.

Further the phosphorus type antioxidant includes tris(2,4-di-t-butylphenyl)phosphite, bis(2,4-di-t-butylphenyl) pentaerythritol phosphite, 4,4'-butyliden-bis(3-methyl-6-t-butylphenyl-di-tridecyl) phosphite, 1,1,3-tris(2-methyl-4-ditridecyl-phosphite-5-t-butyl) and the like.

Moreover, to the polypropylene composition of the present invention, ethylene-based copolymer rubbers and other ingredients such as, for example, weathering agents, flame retardants, antistatic agents, plasticizers, lubricants, copper harm inhibitors and organic/inorganic pigments and pigment dispersing agents may be added within a range not deteriorate the purpose and effect of the present invention.

The method of formulating the above ingredients includes simultaneous formulation of these ingredients when the component materials constituting the polypropylene resin composition are admixed, blending a polypropylene resin master batch containing a high concentration of the materials such as an antioxidant, other various additives and pigments, which previously prepared, during injection molding process or the like. However, the additives are usually added when component materials are blended.

The injection mold article of the polypropylene resin composition is obtained by an ordinary injection molding process.

EXAMPLE

The present invention is explained in further details by way of Examples and Comparative Examples. But, the invention is not restricted thereto.

The measured values in the Examples and Comparative Examples are obtained by the methods described below:
(1) Melt Index (MI, Unit: g/10 min)

MI was measured at 230° C. according to JIS K 7210.
(2) Isotactic Pentad Fraction ([mmmm])

[mmmmm] was calculated according to the method which was reported by A. Zambelli et al. (Macromolecules Vol. 6, 925 page, 1973) using $^{13}$C-NMR spectroscopy.
(3) Degree of Orientation A A resin composition on was prepared by blending nucleating agents (a) and (b) to a polypropylene resin and was subjected to injection molding to provide the No. 1 dumbbell specimen according to ASTM under conditions described in (7) below, and wide angle X-ray diffraction in the vicinity of the central portion of the dumbbell specimen was measured with an apparatus for testing fibrous samples. The degree of orientation A is calculated according to the following equation (I) using a half value width of intensity of a peak assigned (130) face of the specimen:

$$\text{Degree of orientation } A = [(360 - \Sigma Wi)/360] \times 100 \quad (I),$$

wherein Wi represents a half value width of intensity of each peak observed within 2θ.
(4) Degree of Orientation B The wide angle X-ray diffraction in the vicinity of the central portion of the No.1 dumbbell specimen according to ASTM was measured. The degree of orientation B is calculated according to the following equation (II) using a ratio of an intensity of peak assigned (040) face in 2θ=13.72 [I(40)] to an intensity of peak assigned (100) face in 2θ=16.45 [I(110)]:

$$\text{Degree of orientation } B = [I(040)/I(110)] \times 100 \quad (II)$$

(5) Flexural Test (Flexural Modulus, Unit: MPa)

Flexural modulus was measured according to JIS K 7203. The specimens prepared by injection molding were used for the test. Flexural modulus was evaluated under the following conditions:

Thickness of test piece: 6.4 mm

Span length: 100 mm

Loading velocity: 2.0 mm/min.

Measurement temperature: 23° C.

Flexural modulus is an index for rigidity and a larger flexural modulus is indicative of an excellent rigidity.
(6) Heat Distortion Temperature (Unit: ° C.)

Heat distortion temperature was measured according to JIS K 7207. The specimens prepared by injection molding were used for the test. Flexural modulus was evaluated under the following conditions:

Thickness of test piece: 6.4 mm

Testing load: 18.6 kgf.

Temperature raising rate: 120° C./hr.

Heat distortion temperature is an index for thermal resistance and a higher heat distortion temperature is indicative of an excellent thermal resistance.
(7) Preparation of Specimen Specimens for the above testing were prepared by the following method.

After a propylene resin composition was dried at 120° C. for 2 hours, it was injection-molded with an injection molding machine (ISI 50E-V type injection molding machine manufactured by Toshiba Machine Co., Ltd.) under the following conditions:

Molding temperature: 220° C.

Temperature of cooling water for the mold: 50° C.

Injection pressure: 840 kg/cm²

Injection time: 15 seconds

Cooling time: 30 seconds (8) Mold Shrinkage Coefficient Anisotropy

Rectangular parallelepiped specimens with 100 mm in vertical length×400 mm in horizontal length×3 mm in thickness were prepared using an injection molding machine (NEOMAT 350/120 type injection molding machine manufactured by Sumitomo Heavy Industries, Ltd. under the following conditions:

Molding temperature: 220° C.

Temperature of cooling water for the mold: 50° C.

Injection pressure: 115 kg/cm²

Injection time: 15 seconds

Cooling time: 30 seconds

After molding, the prepared specimens were kept at 23° C. under 50% humidity for 48 hours and then the vertical length (TD) and horizontal length (MD) were measured.

Mold shrinkage coefficient in vertical direction (mold shrinkage coefficient (TD), unit: %) and the mold shrinkage coefficient in horizontal direction (mold shrinkage coefficient (MD), unit: %) were calculated according to the following equations (III) and (IV) based on the measured values of the vertical length (TD), the horizontal length (MD) and the original dimensions (vertical length: 100 mm, horizontal length: 400 mm):

Mold shrinkage ratio($TD$)=(vertical length/100)×1000    (III)

Mold shrinkage ratio($MD$)=(horizontal length/400)×1000    (IV)

The mold shrinkage anisotropy was calculated according to the equation (V).

Mold shrinkage coefficient anisotropy=mold shrinkage coefficient($MD$)/mold shrinkage coefficient($TD$)    (V)

The mold shrinkage coefficient anisotropy represents a balance between MD direction and TD direction and the anisotropy is regarded as better as it comes closer to 1.0

Nucleating agents used in the Examples or Comparative Examples were as follows:

(1) Nucleating Agent

Nucleating agent (A): sodium 2,2'-methylene-bis (4,6-di-t-butylphenyl) phosphate (Adekastab NA-11: manufactured by Asahi Denka Kogyo K.K.)

Nucleating agent (B): talc (Micro Ace P-132: manufactured by Nippon Talc K.K)

Nucleating agent (C): Aluminum p-t-butyl benzoate (PTBBA-AL: manufactured by Kyodo Yakuhin K.K.)

Nucleating agent (D): sorbitol type nucleating agent (Gelol DH: manufactured by New Japan Chemical Co., Ltd.)

Example 1

To 100 parts by weight of a propylene homopolymer (Melting point: 162.2° C.: [mmmm]:0.956; MI:25 g/10 mm.) (PP), 0.05 part by weight of Calcium stearate (Calcium Stearate S manufactured by NOF Corporation.) as a stabilizer, 0.05 part by weight of tetrakis[3-(3,5-di-t-butyl-0.4-hydroxyphenyl)propionate] (IRGANOX 1010:manufactured by Ciba Specialty Chemicals, Inc.) as a phenol type antioxidant, 0.05 part by weight of bis(2,4-di-t-butylphenyl) pentaerythrytol phosphite (Adekastab PEP-24G:manufaactured by Asahi Denka Kogyou K.K.) as a phosphorous type antioxidant and 0.2 part by weight of a nucleating agent (A) described in Table 1 and 3.0 parts by weight of talc as a nucleating agent (B) was added and mixed with a Henschel mixer.

The mixture was heated and melt-kneaded and was pelletized with a single screw extruder of 40 mm Ø (TANABE SEISAKUSHO) at a set temperature of 200° C. and a screw rotation rate of 100 rpm. Test pieces were molded from the pellet and physical properties were evaluated.

The ingredients and their respective amounts into the polypropylene resin composition are shown in Table 1, and the evaluation results are shown in Table 1.

Comparative Examples 1 to 10

The polypropylene compositions and the test specimens for physical property test were prepared in the same manner as in Example 1 except that the ingredients and their amounts used in the polypropylene resin composition of Example 1 were changed to those shown in Table 1 and their physical properties were evaluated.

The ingredients and their amounts added in the polypropylene composition are shown in Table 1, and the results of evaluation are shown in Table 2.

TABLE 1

| | PP | Nucleating agent (A) | Nucleating agent (B) | Nucleating agent (C) | Nucleating agent (D) |
|---|---|---|---|---|---|
| Example 1 | 100 | 0.2 | 3 | — | — |
| Comparative Example 1 | 100 | — | 3 | 0.3 | — |
| Comparative Example 2 | 100 | 0.2 | — | 0.3 | — |
| Comparative Example 3 | 100 | — | 3 | — | 0.3 |
| Comparative Example 4 | 100 | 0.2 | — | — | — |
| Comparative Example 5 | 100 | — | 3 | — | — |
| Comparative Example 6 | 100 | 0.1 | 0.5 | — | — |
| Comparative Example 7 | 100 | 0.1 | 1 | — | — |
| Comparative Example 8 | 100 | 0.2 | 0.5 | — | — |
| Comparative Example 9 | 100 | 0.2 | 1 | — | — |
| Comparative Example 10 | 100 | 0.2 | 10 | — | — |

TABLE 2

| | Degree of orientation A | Degree of orientation B | Rigidity (flexural modulus) MPa | Thermal resistance ° C. | Mold shrinkage coefficient anisotropy (MD/TD) |
|---|---|---|---|---|---|
| Example 1 | 47.4 | 379 | 2500 | 89 | 0.96 |
| Comparative Example 1 | 32.2 | 363 | 2275 | 85 | 1.04 |
| Comparative Example 2 | 39.4 | 200 | 2193 | 79 | 0.97 |
| Comparative Example 3 | 51.1 | 244 | 2239 | 85 | 1.02 |

TABLE 2-continued

|  | Degree of orientation A | Degree of orientation B | Rigidity (flexural modulus) MPa | Thermal resistance ° C. | Mold shrinkage coefficient anisotropy (MD/TD) |
|---|---|---|---|---|---|
| Comparative Example 4 | 41.2 | 200 | 2230 | 85 | 0.95 |
| Comparative Example 5 | 32.4 | 1029 | 2310 | 86 | 1.08 |
| Comparative Example 6 | 34.6 | 492 | 2117 | 84 | 0.91 |
| Comparative Example 7 | 30.1 | 510 | 2146 | 82 | 0.92 |
| Comparative Example 8 | 38.3 | 324 | 2251 | 84 | 0.88 |
| Comparative Example 9 | 41.9 | 353 | 2210 | 86 | 0.90 |
| Comparative Example 10 | 44.9 | 648 | 2807 | 93 | 0.91 |

Example 1 which meets the requirements of the present invention is recognized as excellent in rigidity, thermal resistance and small in mold shrinkage coefficient anisotropy.

On the contrary, since Comparative Example 1 does not meet with the requirement of the degree of the orientation A, rigidity and thermal resistance are insufficient. Since Comparative Examples 2 and 3 do not meet the requirement of the degree of orientation B, the rigidity and thermal resistance are insufficient. Since Comparative Example 4 also does not meet the requirement of degree of orientation B, the rigidity, thermal resistance and mold shrinkage coefficient anisotropy are all insufficient. Since Comparative Example 5 does not meet the requirement of degree of the orientation A, the rigidity, thermal resistance and mold shrinkage coefficient anisotropy are insufficient. Since Comparative Examples 6 and 7 do not meet the requirement of the amount of the nucleating agent (b) and the degree of orientation A, the rigidity and thermal resistance are insufficient and the mold shrinkage coefficient anisotropy is not small. Since Comparative Examples 8 and 9 do not meet the requirement of the amount of the nucleating agent (b), the rigidity and thermal resistance are insufficient and the mold shrinkage coefficient anisotropy is not small. Further, Since Comparative Example 10 does not meet the requirement of the amount of the nucleating agent (b), the mold shrinkage coefficient anisotropy is not small.

As described above, according to the present invention, a polypropylene resin composition which can provide an injection molded article excellent in rigidity and thermal resistance, and small in mold shrinkage coefficient anisotropy, and further an injection mold article thereof are provided.

What is claimed is:

1. A polypropylene resin composition which comprises 100 parts by weight of a propylene homopolymer, 0.01 to 1.0 part by weight of phosphoric acid ester type nucleating agent (a) and 1.5 to 5 parts by weight of talc (b), wherein the composition satisfies the following condition (1):

(1) the injection molded article of the polypropylene resin composition has degrees of orientation A and orientation B measured by wide angle X-ray diffraction of not less than 35.0 and not less than 300, respectively.

2. The polypropylene resin composition according to claim 1, wherein the degrees of orientation A and orientation B are not less than 40 and not less than 350, respectively.

3. The polypropylene resin composition according to claim 1, wherein the propylene homopolymer has a melt index measured at 230° C. according to JIS K7210 of 0.01 to 200 g/10 min. and an isotactic pentad fraction of 0.95 or more.

4. The polypropylene resin composition according to claim 1, wherein the propylene homopolymer has a melt index measured at 230° C. according to JIS K7210 of 1 to 100 g/10 min.

5. An injection molded article comprising the polypropylene resin composition of claim 1.

6. An injection molded article comprising the polypropylene resin composition of claim 2.

7. An injection molded article comprising the polypropylene resin composition of claim 3.

8. An injection molded article comprising the polypropylene resin composition of claim 4.

9. An injection molded article of a propylene homopolymer having degrees of orientation A and orientation B measured by wide angle X-ray diffraction of not less than 35.0 and not less than 300, respectively.

* * * * *